(12) United States Patent
Oelpke

(10) Patent No.: US 8,906,127 B2
(45) Date of Patent: Dec. 9, 2014

(54) NON-RETURN VALVE AND FILTER ARRANGEMENT

(75) Inventor: Reinhard Oelpke, Harthausen (DE)

(73) Assignee: Mann+Hummel GmbH, Ludwigsburg (DE)

( * ) Notice: Subject to any disclaimer, the term of this patent is extended or adjusted under 35 U.S.C. 154(b) by 468 days.

(21) Appl. No.: 13/192,613

(22) Filed: Jul. 28, 2011

(65) Prior Publication Data

US 2012/0241031 A1 Sep. 27, 2012

(30) Foreign Application Priority Data

Jul. 30, 2010 (DE) .......................... 10 2010 032 935

(51) Int. Cl.
| | |
|---|---|
| *F02M 35/08* | (2006.01) |
| *F16K 15/02* | (2006.01) |
| *F16K 15/06* | (2006.01) |
| *F02M 35/10* | (2006.01) |

(52) U.S. Cl.
CPC .............. *F16K 15/063* (2013.01); *Y02T 10/16* (2013.01); *F02M 35/086* (2013.01); *F02M 35/10236* (2013.01)
USPC ......... 55/431; 55/385.3; 55/466; 137/543.15; 137/514.5

(58) Field of Classification Search
CPC .... F16K 15/05; F16K 15/063; F02M 35/086; F02M 35/08
USPC ............ 137/514.5, 543.15, 543.23; 55/385.3, 55/431, 466
See application file for complete search history.

(56) References Cited

U.S. PATENT DOCUMENTS

| | | | | |
|---|---|---|---|---|
| 767,118 | A * | 8/1904 | Popham et al. .......... | 137/543.15 |
| 1,082,508 | A * | 12/1913 | Elwell ....................... | 137/543.15 |
| 1,385,932 | A * | 7/1921 | Stayman ................... | 137/543.15 |
| 1,573,520 | A * | 2/1926 | McNab ..................... | 137/543.15 |
| 1,789,711 | A * | 1/1931 | Richardson .............. | 137/543.15 |
| 2,356,360 | A * | 8/1944 | Smolensky ............... | 137/543.13 |
| 2,976,881 | A * | 3/1961 | Briggs et al. ............. | 137/543.23 |
| 3,419,892 | A * | 12/1968 | Wagner et al. ................ | 60/319 |
| 4,126,199 | A | 11/1978 | Hansen et al. | |
| 4,767,425 | A * | 8/1988 | Camplin et al. .............. | 55/431 |
| 5,080,122 | A * | 1/1992 | Neuzeret ................... | 137/543.15 |
| 8,641,792 | B2 * | 2/2014 | Vladaj et al. .................... | 55/431 |

FOREIGN PATENT DOCUMENTS

| | | |
|---|---|---|
| DE | 6608652 U | 9/1971 |
| EP | 0166869 A1 | 3/1985 |
| JP | 59039758 U | 3/1984 |

OTHER PUBLICATIONS

German DPMA Office Action of DE 10 2010 032 935.5.

* cited by examiner

*Primary Examiner* — John Rivell
(74) *Attorney, Agent, or Firm* — James Hasselbeck

(57) ABSTRACT

A motor vehicle non-return valve (10) for protecting a filter from hot exhaust gases, comprises a valve body (65), a valve plate (76), an elastic element (70), and a guide pin (72). The valve plate (76) comprises a sleeve (68) that surrounds the guide pin (72) and the valve plate (76) is slideably guided along the guide pin (72) and prevents a fluid flow through the valve body (65) in a blocking direction (91) and otherwise releases the fluid flow through the valve body (65). The elastic element (70) loads the valve plate (76) with a force that is acting to effect closing, wherein the sleeve (68) in a first sleeve section (71) is movably guided on a guide surface (75) of the guide pin (72) and wherein a second sleeve section (69) surrounds the guide pin (72) and the elastic element (70) in radial direction.

18 Claims, 4 Drawing Sheets

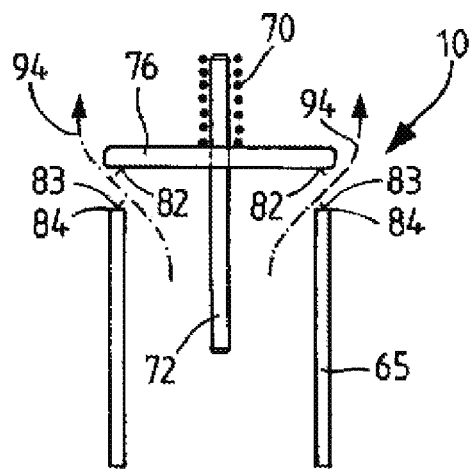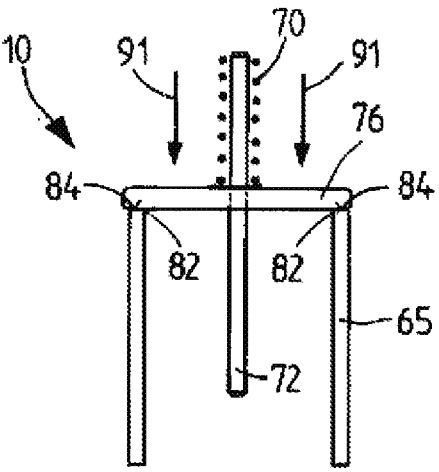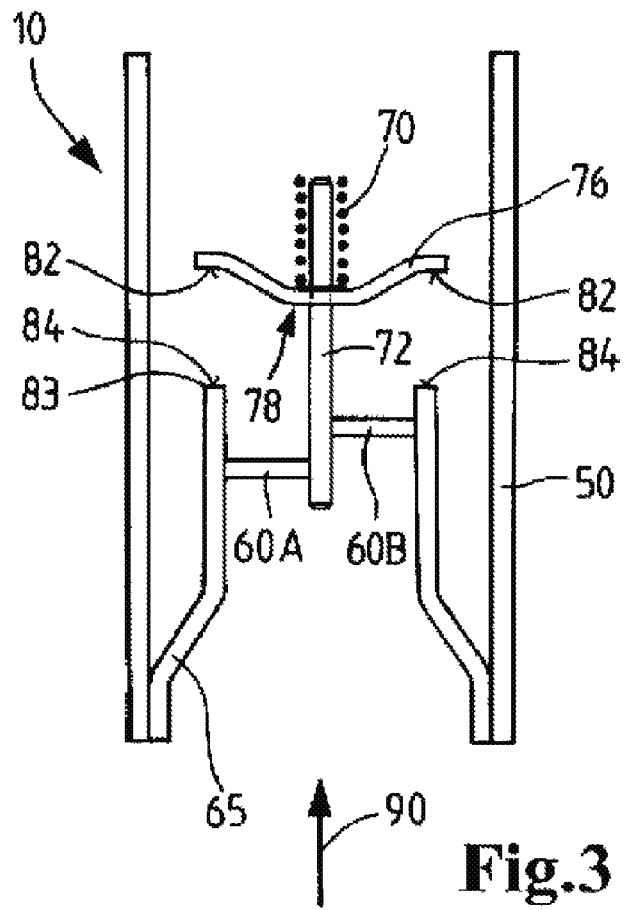

NON-RETURN VALVE AND FILTER ARRANGEMENT

CROSS REFERENCE TO RELATED APPLICATIONS

This application claims the benefit under 35 USC 119 of German patent application 102010032935.5 filed in Germany on Jul. 30, 2010, and which is hereby incorporated by reference in its entirety.

TECHNICAL FIELD

The invention relates to a non-return valve, for example a motor vehicle non-return valve for protecting a filter from hot exhaust gases. Moreover, the invention concerns a filter arrangement for a motor vehicle that comprises a non-return valve.

BACKGROUND OF THE INVENTION

An internal combustion engine of a motor vehicle requires oxygen for combustion of fuel. Therefore, oxygen-containing air from the environment is taken in and purified by means of an air filter. An air filter for a motor vehicle has, for example, a filter body and a separating chamber. The filter body comprises, for example, a filter nonwoven for binding the particles contained in the air. In the separating chamber dirt is collected that is filtered by preseparation from the air and that is not adhering to the filter body.

The separating chamber can be coupled with an exhaust gas ejector in the exhaust gas manifold of the motor vehicle in order to remove the dirt from the separating chamber. The exhaust gas ejector generates underpressure or partial vacuum by means of which the dirt is sucked from the separating chamber and then ejected. Regularly, a non-return valve is arranged between the exhaust gas ejector and the separating chamber because, in some operating states of the internal combustion engine, overpressure is generated in the exhaust gas ejector and this may cause that hot exhaust gas is forced into the air filter. The temperature of the hot exhaust gases can reach approximately 500 degrees Celsius and can damage the air filter, in particular the filter body, of the air filter.

SUMMARY OF THE INVENTION

It is therefore an object of the present invention to provide an improved possibility to protect an air filter of a motor vehicle from hot exhaust gas.

Accordingly, a non-return valve is provided that has a valve body, an elastic element, and a guide pin. The valve plate has a sleeve that surrounds the guide pin. The valve plate is slideably guided along the guide pin and prevents fluid flow through the valve body in a blocking direction and otherwise releases the fluid flow through the valve body. The elastic element loads the valve body with a force that is acting to effect closing. In this connection, the sleeve is movably guided within a first sleeve section on a guide surface of the guide pin and a second sleeve section surrounds the guide pin and the elastic element in radial direction.

Guiding the valve plate by means of the guide pin allows to embody the non-return valve to be lightweight and compact. The non-return valve with the guide pin operates independent of its positions so that it can be mounted in any orientation relative to the exhaust gas or air supply manifolds existing in the vehicle. In case the non-return valve is designed to have rotational symmetry, the guide pin can be arranged, for example, parallel to the axis of rotation that can also be referred to as valve axis. In particular, the axis of rotation can pass through the guide pin. The valve plate is preferably movably guided in axial direction and the non-return valve operates in axial direction. In addition, one, two or several further guide pins can be provided that interact to guide the valve plate.

The sleeve projects, for example, through a valve plate recess of the valve plate. The sleeve itself has an axially extending sleeve extension through which the guide pin projects. Within the recess, for example, a shoulder is arranged on which the elastic element is supported relative to the valve plate.

Upon opening and closing of the valve, the first sleeve section glides across the guide surface of the guide pin and provides preferably a fluid-tight connection. The second section, in particular in axial direction, is at least of such a length that in the closed position of the valve plate the entire guide surface of the guide pin is covered by the sleeve. The sleeve, in particular the first and the second sleeve sections, contribute to the guide surface in any position of the valve plate being protected from dirt; this contributes to reliable functioning of the non-return valve.

The non-return valve is in particular a motor vehicle non-return valve for a motor vehicle. In the motor vehicle, the motor vehicle non-return valve can be provided as a protection of a filter from hot exhaust gases of the motor vehicle.

The elastic element is supported, for example, on the guide pin and on the valve plate, in particular on a stop body that is arranged on the guide pin. In other words, the elastic element can be arranged between the stop body and the valve plate. In particular, the elastic element can be pretensioned between the valve plate and the stop body. As a result of the pretension the elastic element effects a force in the closing direction onto the valve plate so that the latter is in its rest position when in the closed position.

A spring constant of the elastic element is preferably selected such that the valve plate as a result of the restoring force of the elastic element in any position and driving situation is in its closed position except when the air flows in the flow-through direction opposite to the flow blocking direction through the valve body.

In an advantageous embodiment the valve plate has a valve plate recess for the guide pin. The valve plate is guided by the valve plate recess on the guide pin. In this connection it is advantageous when the valve plate recess is formed centrally on the valve plate. This can contribute to avoiding that the valve plate may cant on the guide pin and that the non-return valve may not close or open property.

In order for the guide surface to be protected from dirt, if possible, in any valve position, a bushing which is attached to the valve body and in which the guide pin is secured is designed such that outside of the closed position of the valve plate, in particular for a completely open valve plate, the guide surface is covered by the first sleeve section and the bushing. Together with the sleeve the bushing protects the entire guide surface of the guide pin. This contributes to reliable functioning of the non-return valve. The bushing alternatively can also be attached to a valve housing on which the valve body is attached. In other words, the guide pin is attached by means of the bushing on the valve body or the valve housing.

According to another embodiment, in the closed position of the valve plate a sealing surface of the valve plate interacts seal-tightly with a sealing surface of the valve body. The two sealing surfaces are preferably arranged parallel to each other.

This contributes to an especially good sealing action. The sealing surfaces can be arranged, for example, perpendicularly to the guide pin. As an alternative to one of the guide surfaces, also a sealing edge can be formed that in the closed position of the valve plate interacts seal-tightly with the other sealing surface.

The sealing surface of the valve body is, for example, of an annular shape and the guide pin penetrates a cross-sectional surface area that is surrounded by the sealing surface. The guide pin extends, for example, perpendicularly to a circular surface, delimited by the annular sealing surface, at the center of the corresponding circle.

The sealing surfaces may be comprised exclusively of metal. Thus, preferably no further seal or sealing ring is provided. In this way, the non-return valve is particularly robust and producible in a simple way.

In a further embodiment the valve plate is of a bell shape. In this connection, the closed outwardly curved side of the bell is oriented opposite to the flow-through direction. A base surface of the bell is substantially oriented perpendicularly to the flow direction. The base surface comprises the sealing surface that, in the closed position, is seal-tightly seated on the sealing surface of the valve body. In the area of the base surface the valve plate can deviate from the bell shape. For example, the valve plate in the area of the base surface can have an enlarged radius so that a collar, in particular a sealing collar, a lip, a rim, a circumferentially extending ring or a flange is formed. The sealing surface of the valve plate can be formed, for example, on the collar of the valve plate. The shape of the valve plate can also deviate from the bell shape. For example, the valve plate can be plate-shaped conical, or of a truncated cone shape, wherein, for example, a plate rim of the valve plate comprises the sealing surface of the valve plate. The collar prevents canting of the valve plate and contributes to an excellent sealing action.

The non-return valve can be simply produced in that the valve body is arranged in the valve housing or is inserted into the valve housing, for example, by means of press fit. Alternatively or in addition, the valve body can be adhesively connected, welded or soldered to the valve housing. The valve housing is, for example, tubular.

The tubular configuration of the valve body and/or of the valve housing enables a flexible utilization. The non-return valve can be coupled, for example, easily to hoses or pipes. The non-return valve forms a unit that can be easily retrofitted.

Moreover, a filter arrangement, in particular for a motor vehicle, is proposed that comprises a filter chamber with an air filter, a separating chamber, an exhaust gas ejector, and the non-return valve. The non-return valve is arranged in flow direction between the separating chamber and the exhaust gas ejector. The non-return valve enables a fluid flow from the separating chamber to the exhaust gas ejector, i.e., in flow-through direction, and prevents fluid flow from the exhaust gas ejector to the separating chamber, i.e., in the flow blocking direction.

The non-return valve is in this connection exposed to raw air that is loaded with dust particles.

In a further embodiment the elastic element is arranged on a side of the valve plate that is facing the exhaust gas ejector. Alternatively, the elastic element can also be arranged on a side of the valve plate that is facing away from the exhaust gas ejector.

Moreover, the elastic element is embodied, in particular with respect to its spring constant, such that the valve plate for proper operation of the filter arrangement releases the fluid flow in flow-through direction and in this way enables blowing out contaminants from the separating chamber. In the blocking direction the valve plate prevents the fluid flow and protects the air filter from hot exhaust gas.

As a material for the components of the non-return valve, for example, the valve body, the valve plate, the bushing, the sleeve and/or the elastic element, preferably temperature-resistant materials such as metal, steel or heat-resistant plastic materials are used. The materials are, for example, heat-resistant at temperatures between 400 degrees and 600 degrees Celsius, in particular at above 500 degrees Celsius.

In various aspects of the invention the non-return valve includes a valve body having a flow passage extending between inlet and outlet ends. A valve plate is arranged in and slideably constrained to move along a predetermined axis in the valve body. The axis may be the axis corresponding to the flow through the valve body. The valve plate is movable along the axis between a valve open position and closed position. A force generating elastic element, for example a spring element or coil spring, is arranged to act upon the valve plate to urge the valve plate to move in a blocking direction into the closed position. An elongated guide pin is arranged in and mounted within the valve body and defines the axis along which the valve plate moves. The guide pin generally extends in the valve body at least partially between inlet and outlet ends of the valve body. The plate has secured thereto a sleeve received over and surrounding an exterior of the elongated guide pin. The sleeve includes an axial bore into which at least a portion of the guide pin is slideably received. The sleeve may include a first sleeve section slideably received over and guided by sliding contact with and along a guide surface of the guide pin. A second sleeve section may be provided and may circumferentially surround at least a portion of a length of the guide pin. At least a portion of the elastic element may be arranged within sleeve recess of the second sleeve section between the second sleeve section and the guide pin. The valve plate is mounted to the sleeve to slideably move with the sleeve along the guide pin within the valve body.

In further aspects of the invention the non-return valve may advantageously include a first dust shield. The dust shield includes a first sleeve section preferably entirely covering the entire guide surface of the guide pin at an inlet side of the non-return valve when the valve plate is in the closed position, thereby isolating sliding surfaces from dust that may be present (such as in the dirty side of the filter housing) at the inlet side of the valve.

In further aspects of the invention the non-return valve may advantageously include a second dust shield including a tubular bushing extension surrounding and covering the first sleeve section at the inlet side of the valve when the valve plate is in the closed position. The second dust shield further isolates the moving and sliding parts of the non-return valve from dust and particulates.

In various aspects of the invention, the valve body sealing surface and the valve plate sealing surface may be comprised exclusively of metals or ceramics, particularly and advantageously without elastomeric or plastic sealing members or other heat sensitive or heat damaged components. This is particularly advantageous in for valve durability and operation when exposed to high temperatures such as from exhaust gases.

In various aspects of the invention, the non return valve may be advantageously arranged external to and separated from other components, particularly the filter housing and other heat sensitive components. This is advantageous for serviceability/replacement reasons. Arranging the non-return valve separate from the filter housing and other heat sensitive components may also be advantageous as the separation provides thermal isolation between the hot exhaust gases present at the inlet side of the non-return valve and the temperature sensitive components of the filter housing and filter element. For example, the filter element may often include elastomeric seals and filter media that are damaged by exposures to high temperature. Additionally the filter housing typically made from molded plastic materials which may be damaged by high temperatures.

Further possible implementations of the invention comprise also combinations that are not explicitly mentioned of features or variants relating to the embodiments which features or variants are disclosed above or in the following. In this connection, a person of skill in the art will also add individual aspects as improvements or supplements to the respective basic form of the invention.

BRIEF DESCRIPTION OF THE DRAWINGS

The accompanying Figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Features of the present invention, which are believed to be novel, are set forth in the drawings and more particularly in the appended claims. The invention, together with the further objects and advantages thereof, may be best understood with reference to the following description, taken in conjunction with the accompanying drawings. The drawings show a form of the invention that is presently preferred; however, the invention is not limited to the precise arrangement shown in the drawings.

FIG. 2A is a schematic illustration of the non-return valve in a first valve position, consistent with the present invention;

FIG. 2B is a schematic illustration of the non-return in a second valve position, consistent with the present invention;

FIG. 3 is a schematic illustration of a second embodiment of a non-return valve with a valve housing, consistent with the present invention;

In the Figures same or functionally the same elements, if not noted otherwise, are identified by same reference characters.

Figure 1:
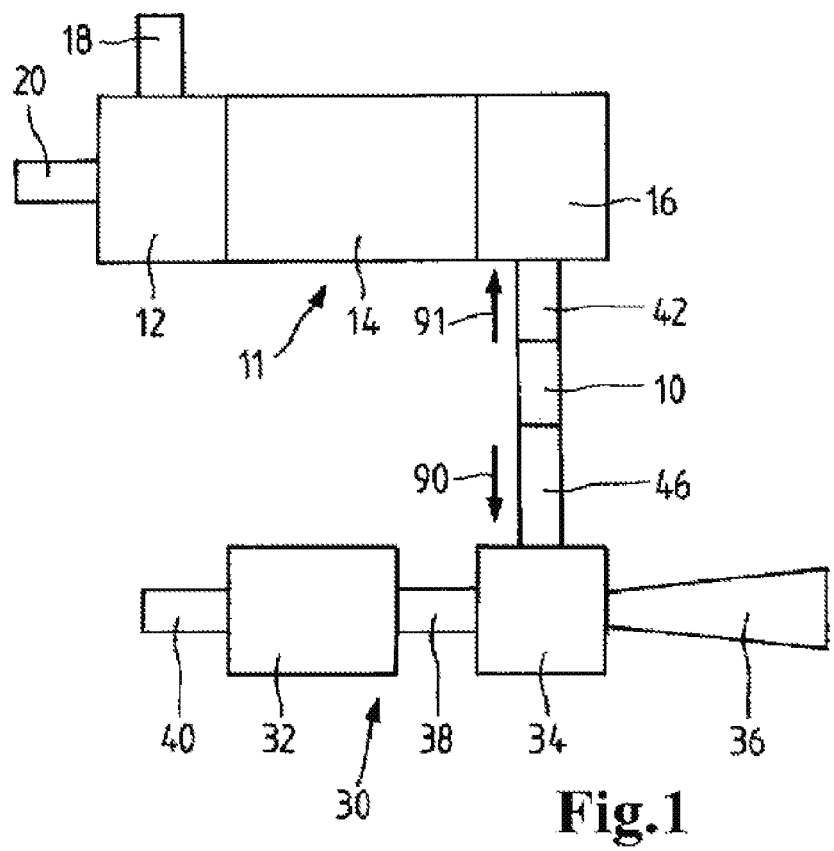
FIG. 1 is a schematic illustration of an exhaust gas manifold of an internal combustion engine and a filter arrangement, consistent with the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of apparatus components related to a non-return valve and filter arrangement with the non-return valve. Accordingly, the apparatus components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

FIG. 1 shows a non-return valve, in particular a motor vehicle non-return valve 10, a filter arrangement 11, and an exhaust gas manifold 30. The filter arrangement 11 has a connecting chamber 12, a filter chamber 14, and a separating chamber 16. The filter arrangement 11 is, for example, arranged on a motor vehicle that is not illustrated. The filter arrangement 11 serves for filtering a fluid, for example air, that is sucked in by an air intake 18 from the environment of the motor vehicle and that is supplied to an internal combustion engine of the motor vehicle by air supply 20 for a combustion process.

Exhaust gas of the combustion process is released by an exhaust gas manifold 30 into the environment. The exhaust gas manifold 30 has a muffler 32, an intermediate pipe 38, an exhaust gas ejector 34, and an exhaust pipe 36. The exhaust gas manifold 30 communicates with the internal combustion engine by means of an exhaust gas supply 40. The exhaust gas ejector 34 communicates with the separating chamber 16 by means of a first connecting hose 42, a second connecting hose 46, and the motor vehicle non-return valve 10.

The motor vehicle non-return valve 10 is suitable for releasing an air flow in a flow-through direction 90 from the separating chamber 16 to the exhaust gas ejector 34 and for preventing an air flow in a flow blocking direction 91 from the exhaust gas ejector 34 toward the separating chamber 16.

As an alternative to the air, by means of the motor vehicle non-return valve 10 also a flow of a different fluid can be controlled, for example, of fuel or another operating medium of the motor vehicle. Moreover, the non-return valve can also be used outside of the motor vehicle.

During operation of the internal combustion engine air is sucked in through the air supply 18 and purified by means of a filter body, not illustrated, that is for example, a nonwoven filter and arranged in the filter chamber 14. In particular, dirt particles are removed from the air by the filter body and adhere to it. The dirt and the dirt particles comprise, for example, sand, ore dust, grain chaff and/or peat fibers. Moreover, the air, before or after filtering, can be moved by means of the filter body such that dirt particles will separate in the separating chamber 16 and deposit therein. The deposited dirt in the separating chamber 16 can be removed by the two connecting hoses 42, 46 and by means of the motor vehicle non-return valve 10. For this purpose, an underpressure or a partial vacuum is generated in the exhaust gas ejector 34 that removes the dirt by suction from the separating chamber 16.

In order to prevent that in certain operating situations in which the exhaust gas ejector 34 overpressure exists, for example, when shifting into idle, hot exhaust gas can be forced into the filter arrangement 11, the motor vehicle non-return valve 10 prevents the airflow in the flow blocking direction 91. In contrast to this, the motor vehicle non-return valve 10 releases the airflow in the flow direction 90.

Figure 2:
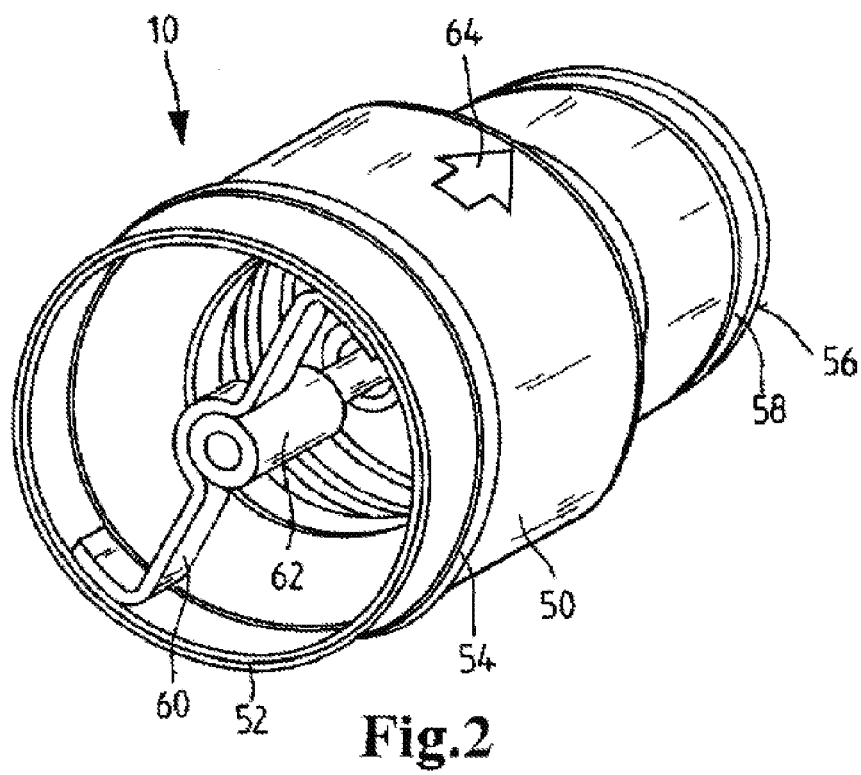
FIG. 2 presents a perspective view of a first embodiment of a non-return valve, consistent with the present invention.

FIG. 2 shows a perspective illustration of a motor vehicle non-return valve 10 with a valve housing 50. At a first connecting side 52 of the valve housing 50 a first bead 54 is formed. At a second connecting side 56 of the valve housing 50 positioned opposite the first connecting sides 52, the valve housing 50 has a second bead 58. The two beads 54, 58 are trough-shaped bulges which are formed in the valve housing 50. The stay 60 connects a bushing 62 with the valve housing 50. On the exterior side of the valve housing 50 a mounting direction 64 is indicated, for example, in the shape of an arrow that indicates after proper mounting of the motor vehicle non-return valve 10 the flow direction 90.

At the two connecting sides 52, 56, the two connecting hoses 42, 46 can be connected. The beads 54, 58 serve to secure the connecting hoses 42, 46 slipped onto the connecting sides 52, 56 to the motor vehicle non-return valve 10 so that the hoses cannot slide off. The diameter of the motor vehicle non-return valve 10 at the connecting sides 52, 56 can be embodied as a function of the connecting hoses 42, 46 to be connected thereto.

FIG. 2A shows with the aid of a further embodiment a functional principle of the motor vehicle non-return valve 10 that comprises a valve body 65, an elastic element 70, a guide pin 72, and a valve plate 76. The valve plate 76 is slideably guided on the guide pin 72. The elastic element 70 is arranged on a side of the valve plate 76 that is facing away from the valve body 65. As an alternative to this, the elastic element 70 can also be arranged on a side of the valve plate 76 that is facing the valve body 65.

The valve body 65 has at the axial end that is facing the valve plate 76 a valve body rim 84 on which a sealing surface 83 of the valve body 65 is formed. The valve plate 76 has at its rim a sealing surface 82 of the valve plate 76. The valve plate 76 is plate-shaped or disk-shaped. No further seals, for example, like an O-ring of plastic material, are required.

Outside of the closed position of the valve plate 76, air flows in the flow-through direction 90 through the valve body 65. In the area of the valve plate 76 the air flows about the valve plate 76 so that a non-linear flow 94 results. The flow-through direction 90, relative to the flow direction upstream and downstream of the valve plate 76, is well defined and substantially oriented in a straight line. The flow-through direction 90 is, for example, parallel to the axis of the filter. The elastic element 70 loads the valve plate 76 with a force in the closing direction. The spring constant of the elastic element 70 is selected such that the valve plate 76, when the motor vehicle non-return valve 10 in the motor vehicle is operating properly, releases the air flow through the valve body 65 in the flow-through direction 90 and otherwise prevents it.

FIG. 2B shows the functional principle of the motor vehicle non-return valve 10 with the valve plate 76 in the closed position. In the closed position the sealing surface 82 of the valve plate 76 and the sealing surface 83 of the valve body 65 interact seal-tightly with each other. In addition to the spring force of the elastic element 70 the air effects in the flow blocking direction 91 a closing force acting on the valve plate 65.

FIG. 3 shows the functional principle of a motor vehicle non-return valve 10 with the aid of a further embodiment with open valve plate 76. The valve body 65 is secured in the valve housing 50. The valve housing 50 is embodied to be tubular which contributes to simple mounting of the non-return valve 10 because the valve body 65 can then be inserted into and removed from the valve housing 50, i.e., exchanged, in a simple way. The guide pin 72 is connected by a first arm 60A and a second arm 60B of the stay 60 on the valve body 65. The valve plate 76 is formed in a bell shape wherein a valve bell tip 78 is oriented in a direction opposite to the flow-through direction 90. Moreover, the valve plate 76 has a flat rim on which the sealing surface 82 of the valve plate 76 is formed.

Figure 4:
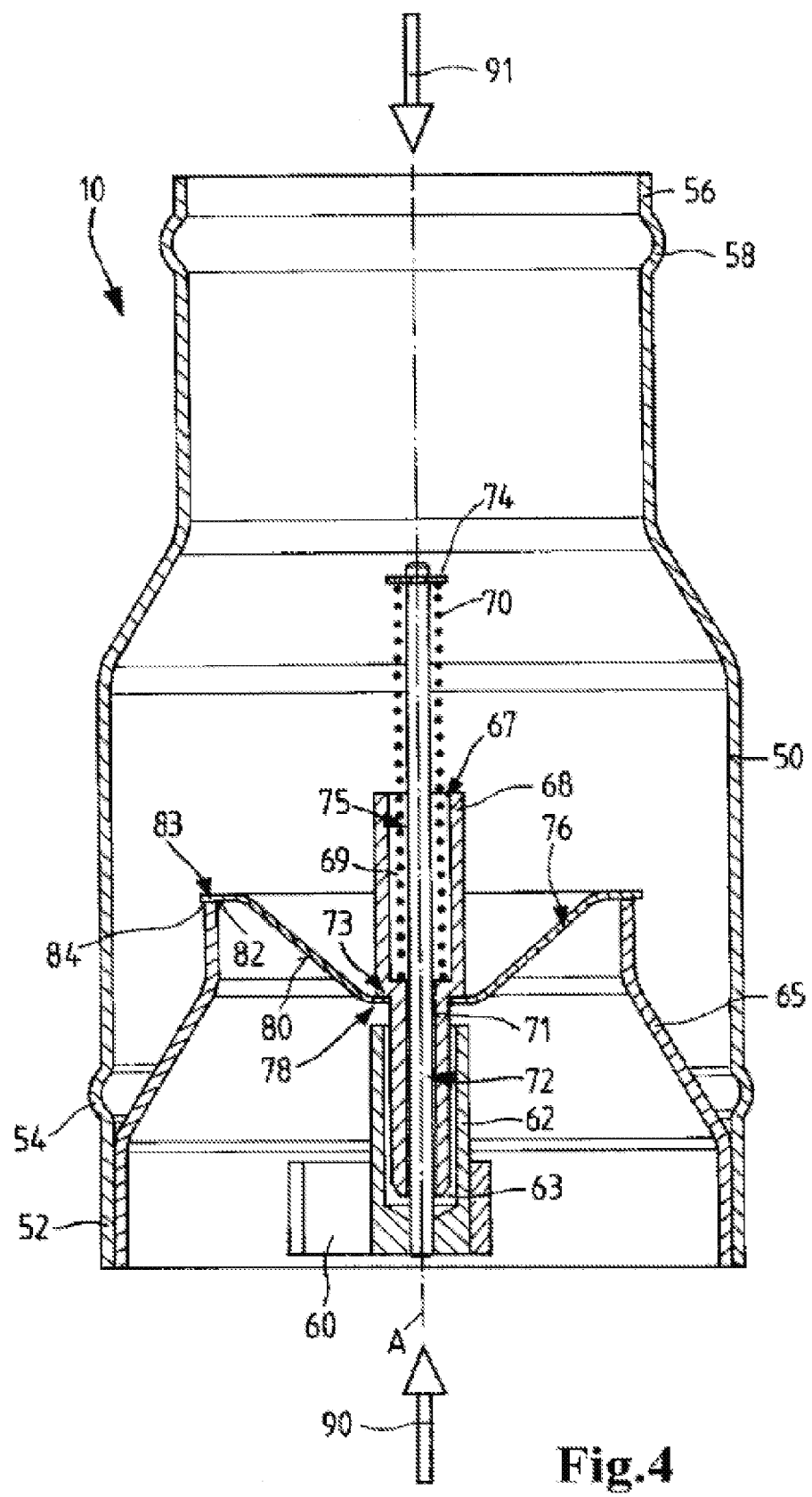
FIG. 4 presents a cross-section of a third embodiment of a non-return valve in closed position, consistent with the present invention.

FIG. 4 shows a cross-section of yet another embodiment of a motor vehicle non-return valve 10 with the valve plate 76 in closed position. In the closed position of the valve plate 76 the air flow is prevented by the motor vehicle non-return valve 10 in the flow blocking direction 91. The valve body 65 is inserted into the valve housing 50 and secured in the valve housing 50, for example, by press fit, by means of a non-illustrated welding seam, by means of brazing and/or an adhesive connection. The valve body 65 has the valve body rim 84 that comprises the sealing surface 83 of the valve body 65 and that interacts in the closed valve position with the sealing surface 82 of the valve plate 76 in a seal-tight fashion.

Valve plate 76 in this embodiment is of a bell shape wherein the valve bell tip 78 of the bell-shaped valve plate 76 again is oriented in a direction opposite to the flow direction 90. A wall surface 80 of the bell-shaped valve plate 76 extends from the valve bell tip 78 up to a base surface of the valve plate 76. In the area of the base surface the valve plate 76 deviates from the bell shape and has in the area of the base surface a widened diameter. In other words, in the area of the base surface a valve collar or sealing collar is formed which comprises the sealing surface 82 of the valve plate 76.

The shape of the valve plate 76 may also deviate from the bell shape. For example, the valve plate 76 can be plate-shaped, conical, or of a truncated cone shape. The valve plate 76, for example, can be stamped from a material block, punctured or drawn. As an alternative to the valve or sealing collar, a lip, a flat rim, or a circumferentially extending ring can be formed on the valve plate 76 on which the sealing surface 82 of the valve plate 76 is formed. The sealing surface 82 arranged in this way enables an especially good sealing action with the sealing surface 83 of the valve body 65.

The valve plate 76 has a central recess 73 through which a sleeve 68 projects. The valve plate 76 is fixedly connected to the sleeve 68. The sleeve 68 has an axially extending sleeve recess 67 in which at least partially the guide pin 72 is arranged that also extends axially. The guide pin 72 can also be referred to as valve guide. The sleeve recess 67 has an axially extending first sleeve section 71 that, for example, has clearance fit relative to the guide pin 72 and by means of which the sleeve 68 and thus the valve plate 76 connected to the sleeve 68 are guided in axial direction. The first sleeve section 71 of the sleeve 68 moves during opening and closing of the valve across a gliding or guiding surface 75 of the guide pin 72. When doing so, preferably no air passes through the guide pin 72 or the sleeve 68 or the bushing 62 from the intake side to the outlet side of the non-return valve 10.

In addition, the sleeve recess 67 has an axially extending second sleeve section 69 having a diameter that is greater than the diameter of the first axial sleeve section 71. In this way, at the transition from the first to the second axial sleeve sections 71, 69 a shoulder is formed on which an elastic element 70, in particular, a spring, in particular a spiral spring or a coil spring, is supported. The elastic element 70 is arranged on a side of the valve plate 76 facing the exhaust gas ejector 34. Alternatively, the elastic element 70 can be arranged on a side of the valve plate 76 that is facing away from the exhaust gas ejector 34.

The diameter of the second axial sleeve section 69 is so large that the elastic element 70 can be received therein so that the sleeve 68 surrounds the elastic element 70 at least partially in radial direction. At an end of the guide pin 72 that is facing away from the bushing 62 a stop body 74 is arranged. The elastic element 70 is pretensioned between the stop body 74 and the shoulder of the sleeve recess 67 so that, in the closed position the motor vehicle non-return valve 10, a force that is acting in the closing direction is acting onto the sleeve 68 and thus onto the valve plate 76. The valve plate 76 is therefore in its closed position as long as there is no air flowing through the valve body 65.

The guide pin 72 is secured at the axial end that is facing away from the stop body 74 in a bushing recess 63 of the bushing 62. For this purpose, the bushing recess 63 has a first axial bushing section that is formed, for example, with press fit relative to the guide pin 72 and that serves to secure the guide pin 72. In addition, or as an alternative to the press fit, the guide pin 72 can be secured by brazing, welding or gluing in the bushing recess 63. A second axial bushing section of the bushing recess 63 has such a large diameter that in the closed valve position it can receive the sleeve 68 and surround it in radial direction. In other words, the sleeve 68 and the bushing 62 are embodied together in a telescoping arrangement.

In the closed position, the bushing 62 protects the part of the sleeve 68 arranged in the bushing recess 63 from dirt and sleeve 68 protects the entire guide surface 75 of the guide pin 72 from dirt; this contributes to proper functioning of the motor vehicle non-return valve 10. Moreover, the second axial sleeve section 69 of the sleeve recess 67 protects at least partially the elastic element 70 from dirt.

Should air flow in the flow-through direction 90 through the valve body 65, the valve plate 76 moves, depending on a force balance, out of its closed position. The spring force acting in the closing direction and the air pressure acting opposite to the closing direction contribute to the force balance. The elastic element 70 is designed, for example, such that is closes securely the motor vehicle non-return valve 10 also under the action of dynamic driving forces of up to five times the gravity acceleration. For this purpose, the elastic element 70 comprises, for example, a spring constant of 0.1 N/mm Should the force as a result of air pressure in the flow direction 90 be greater than the spring force, the valve plate 76 moves out of its closed position. Otherwise, the valve plate 76 as a result of the spring force remains in its closed position.

Figure 5:
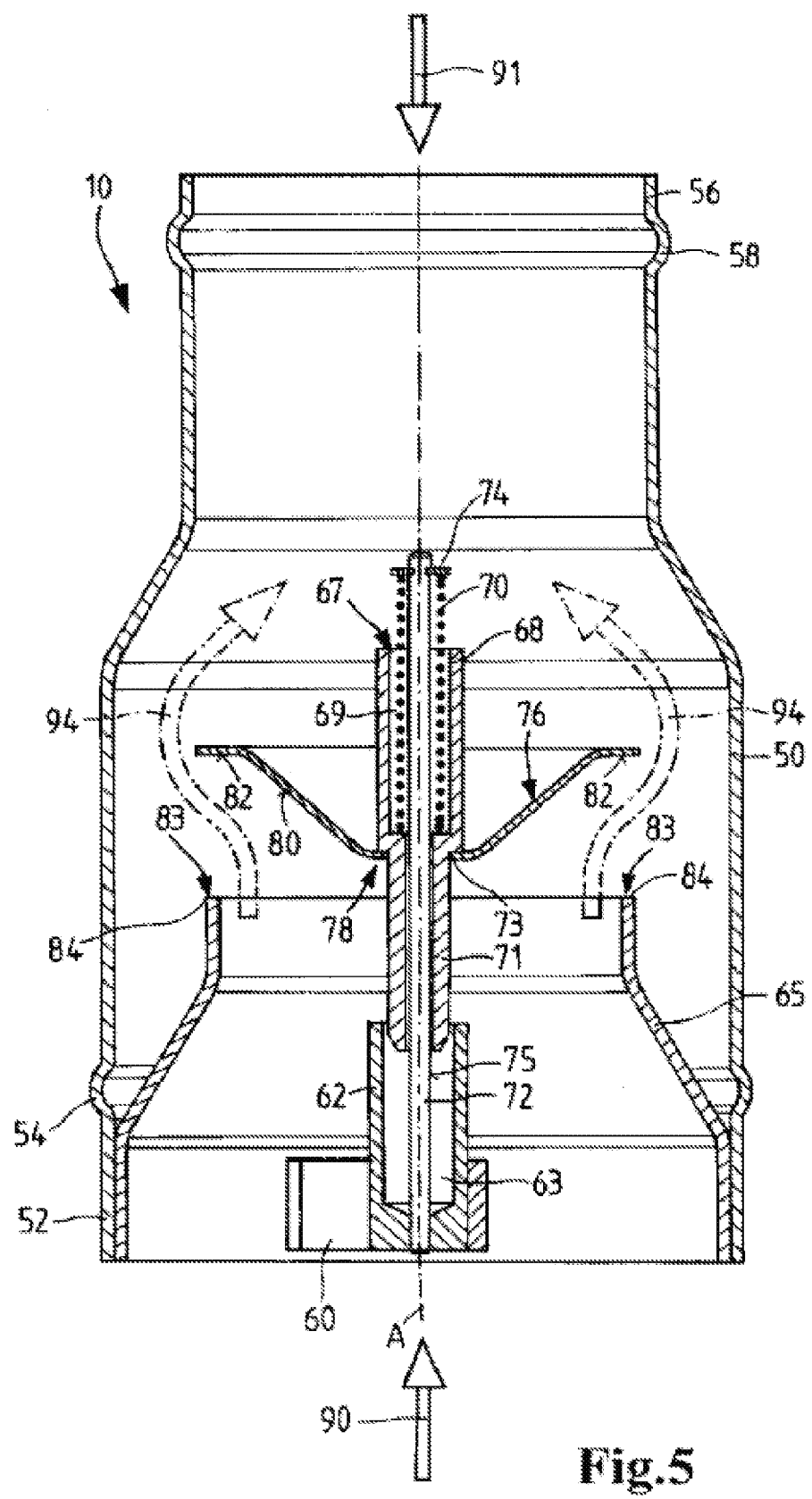
FIG. 5 presents a cross-sectional view of the third embodiment of the non-return valve outside of closed position, consistent with the present invention.

FIG. 5 shows the valve plate 76 outside of its closed position. Outside of the closed position, the valve plate 76 releases the air flow in the flow-through direction 90 through the valve body 65. When the valve plate 76 is open the air flows in the flow-through direction 90 through the valve body 65. Should the airflow in the flow-through direction 90 decrease or should the air flow be flowing in a direction opposite to the flow-through direction 90, the valve plate 76 will move again into its closed position and prevent airflow through the motor vehicle non-return valve 10.

Outside of the closed position, the guide surface 75 of the guide pin 76 in radial direction is protected from dirt by the bushing 62 and the sleeve 68. At the end that is facing away from the bushing 62 almost the entire guide pin 72 is protected by the sleeve 68 from dirt. in particular, by means of the bushing 62 in the sleeve 68 the entire guide surface 75 of the guide pin 72 in any valve position is protected from dirt.

The individual components of the motor vehicle non-return valve 10 can be secured, for example, by means of press fit on each other. Alternatively or in addition, the components can be welded to each other or soldered to each other, for example, by brazing. Moreover, the components of the motor vehicle non-return valve 10 are designed for use at high temperatures, for example of up to 500 degrees Celsius and, for example, comprised of metal, in particular steel. The motor vehicle non-return valve 10 is substantially embodied to have rotational symmetry relative to the guide pin 72.

The invention is not limited to the disclosed embodiments and examples. For example, the embodiments can be combined with each other.

In the foregoing specification, specific embodiments of the present invention have been described. However, the invention is not limited to the disclosed embodiments and examples. For example, the embodiments can be combined with each other. One of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

The invention claimed is:

1. A non-return valve for protecting an air filter from backflow of hot exhaust gases, said non-return valve comprising:
   a valve body having a flow passage extending between inlet and outlet ends of said valve body;
   a valve plate arranged in and slideably constrained to move along a predetermined axis in said valve body, said valve plate movable between an open position and a closed position;
   a force generating elastic element acting upon said valve plate urging said valve plate to move in a blocking direction into said closed position along said axis;
   an elongated guide pin arranged mounted within said valve body and defining said axis along which said valve plate moves, said guide pin extending in said valve body at least partially between inlet and outlet ends of said valve body;
   a sleeve received over and surrounding an exterior of said guide pin, said sleeve having an axial bore into which at least a portion of said guide pin is slideably received, said sleeve including
   a first sleeve section slideably received over and guided by sliding contact with and along a guide surface of said guide pin;
   a second sleeve section circumferentially surrounding at least a portion of a length of said guide pin;
   wherein said sleeve is slideably moveable along at least a portion of a length of said guide surface of said guide pin,
   wherein at least a portion of said elastic element is arranged within said second sleeve section between said second sleeve section and said guide pin,
   wherein said valve plate is mounted to said sleeve to slideably move with said sleeve along said guide pin within said valve body, wherein said non-return valve prevents a fluid flow through said valve body in a blocking direction and otherwise releases the fluid flow through said flow passage of said valve body in a direction opposite said blocking direction, wherein said non-return valve further includes an elongated bushing mounted to said valve body, said bushing including
a bushing base;
a tubular extension extending axially outwardly away from said bushing base and having a bore aligned with said axis;
wherein said guide in is arranged at least partially inside of said tubular extension and secured to said bushing base;
wherein said guide surface of said guide pin between said valve plate and said bushing base is covered by said first sleeve section and said tubular extension of said bushing when in said in closed position.

2. The non-return valve according to claim 1 wherein when said valve plate is in said closed position, said first and said second sleeve sections together entirely cover the entire guide surface of said guide pin.

3. The non-return valve according to claim 1, wherein said first sleeve section has a bore that forms a clearance fit over said guide pin to be smoothly slideably guided on said guide pin;
wherein said sleeve and said guide pin are movable relative to each other in a fluid-tight way such that fluid cannot pass between said guide pin and said sleeve through said bore of said first sleeve section.

4. The non-return valve according to claim 1, wherein said non-return valve further includes an elongated bushing mounted to said valve body, said bushing including
a bushing base;
a tubular extension extending axially outwardly away from said bushing base and having a bore aligned with said axis;
wherein said guide pin is arranged at least partially inside of said tubular extension and secured to said bushing base;
wherein said guide surface of said guide pin between said valve plate and said bushing base is covered by said first sleeve section and said tubular extension of said bushing when in said in closed position.

5. The non-return valve according to claim 4, wherein said valve body, said valve plate, said guide pin, said elastic element, said sleeve and/or said bushing are made of metal.

6. The non-return valve according to claim 1, wherein said valve plate further includes a sealing surface;
wherein said valve body further includes a sealing surface;
wherein said valve body sealing surface and said valve plate sealing surface are substantially arranged parallel to each other and are aligned to closeably mate,
wherein when said valve plate is in said closed position, said valve body sealing surface and said valve plate sealing surface seal-tightly close against each other, said seal-tight closure closing said flow passage blocking flow through said valve body.

7. The non-return valve according to claim 6, wherein said elongated guide pin is arranged perpendicularly to said valve body sealing surface and to said valve plate sealing surface.

8. The non-return valve according to claim 6, wherein said sealing surface of said valve plate is an annular collar portion of said valve plate.

9. The non-return valve according to claim 6, wherein said sealing surface of said valve body is of an annular shape, and
wherein said valve guide pin penetrates a cross-sectional valve plate surface surrounded by said valve body sealing surface.

10. The non-return valve according to claim 6, wherein said valve body sealing surface and said valve plate sealing surface are comprised exclusively of metal without elastomeric or plastic sealing members,
wherein sealing between said sealing surfaces is exclusively metal to metal.

11. The non-return valve according to claim 1, wherein said valve plate is of a bell shape.

12. The non-return valve according to claim 1, wherein said valve body is arranged in a tubular valve housing.

13. A filter arrangement for a motor vehicle, said filter arrangement comprising:
an air filter element;
an air filter housing including
a filter chamber into which said air filter element is arranged;
a separating chamber;
an exhaust gas ejector fluidically coupled for fluid flow to said separating chamber;
a non-return valve according to claim 1, said non-return valve arranged in a fluid flow line fluidically coupling said separating chamber and said exhaust gas ejector,
wherein said non-return valve arranged in said fluid flow line to permit fluid flow in a first direction through said non-return valve from said separating chamber to said exhaust gas ejector, and
wherein said non-return valve prevents fluid flow from said exhaust gas ejector into said separating chamber.

14. The filter arrangement according to claim 13, wherein said elastic element is arranged on a downstream side of said valve plate in a flow direction towards said exhaust gas ejector.

15. The filter arrangement according to claim 13, wherein said elastic element has a spring constant selected to be overcome by a predetermined air pressure difference between an underpressure at said exhaust gas ejector and said separating chamber such that said non-return valve is opened to fluid flow from said separating chamber to said exhaust gas ejector by said predetermined pressure difference;
wherein dirt accumulated in said separating chamber is blown out of said separating chamber through said non-return valve to said exhaust gas ejector,
wherein said non-return valve prevents fluid flow in said blocking direction, preventing hot exhaust gases from flowing into said filter housing and filter element.

16. The filter arrangement according to claim 13, wherein said non-return valve is arranged external to and separate from said air filter housing.

17. A non-return valve for protecting an air filter from backflow of hot exhaust gases, said non-return valve comprising:
a valve body having a flow passage extending between inlet and outlet ends of said valve body;
a valve plate arranged in and slideably constrained to move along a predetermined axis in said valve body, said valve plate movable between an open position and a closed position;
a force generating elastic element acting upon said valve plate urging said valve plate to move in a blocking direction into said closed position along said axis;

an elongated guide pin arranged mounted within said valve body and defining said axis along which said valve plate moves, said guide pin extending in said valve body at least partially between inlet and outlet ends of said valve body;
a sleeve received over and surrounding an exterior of said guide pin, said sleeve having an axial bore into which at least a portion of said guide pin is slideably received, said sleeve including
a first sleeve section slideably received over and guided by sliding contact with and along a guide surface of said guide pin;
a second sleeve section circumferentially surrounding at least a portion of a length of said guide pin;
wherein said sleeve is slideably moveable along at least a portion of a length of said guide surface of said guide pin,
wherein at least a portion of said elastic element is arranged within said second sleeve section between said second sleeve section and said guide pin,
wherein said valve plate is mounted to said sleeve to slideably move with said sleeve along said guide pin within said valve body,
wherein said non-return valve prevents a fluid flow through said valve body in a blocking direction and otherwise releases the fluid flow through said flow passage of said valve body in a direction opposite said blocking direction,
wherein said non-return valve includes a first dust shield, said dust shield comprising said first sleeve section arranged to entirely cover the entire guide surface of said guide pin at an inlet side of said non-return valve when said valve plate is in said closed position,
wherein said non-return valve includes a second dust shield, said second dust shield comprising
a tubular bushing extension surrounding and covering said first sleeve section at said inlet side of said valve when said valve plate is in said closed position.

18. A non-return valve for protecting an air filter from backflow of hot exhaust gases, said non-return valve comprising:
a valve body having a flow passage extending between inlet and outlet ends of said valve body;
a valve plate arranged in and slideably constrained to move along a predetermined axis in said valve body, said valve plate movable between an open position and a closed position;
a force generating elastic element acting upon said valve plate urging said valve plate to move in a blocking direction into said closed position along said axis;
an elongated guide pin arranged mounted within said valve body and defining said axis along which said valve plate moves, said guide pin extending in said valve body at least partially between inlet and outlet ends of said valve body;
a sleeve received over and surrounding an exterior of said guide pin, said sleeve having an axial bore into which at least a portion of said guide pin is slideably received, said sleeve including
a first sleeve section slideably received over and guided by sliding contact with and along a guide surface of said guide pin;
a second sleeve section circumferentially surrounding at least a portion of a length of said guide pin;
wherein said sleeve is slideably moveable along at least a portion of a length of said guide surface of said guide pin,
wherein at least a portion of said elastic element is arranged within said second sleeve section between said second sleeve section and said guide pin,
wherein said valve plate is mounted to said sleeve to slideably move with said sleeve along said guide pin within said valve body,
wherein said non-return valve prevents a fluid flow through said valve body in a blocking direction and otherwise releases the fluid flow through said flow passage of said valve body in a direction opposite said blocking direction
wherein said non-return valve includes a first dust shield, said first dust shield comprising
said first sleeve section arranged to entirely cover the entire guide surface of said guide pin at an inlet side of said non-return valve when said valve plate is in said closed position,
wherein said non-return valve further includes an elongated bushing mounted to said valve body, said bushing including
a bushing base;
a second dust shield comprising
a tubular bushing extension extending axially outwardly away from said bushing base, said tubular extension surrounding and covering said first sleeve section at said inlet side of said valve when said valve plate is in said closed position,
wherein said guide pin is arranged at least partially inside of and secured to said bushing base,
wherein said guide surface of said guide pin between said valve plate and said bushing base is covered by said first sleeve section and said tubular extension of said bushing when in said closed position,
wherein said first sleeve section has a bore that forms a clearance fit over said guide pin to be smoothly slideably guided on said guide pin,
wherein said sleeve and said guide pin are movable relative to each other in a fluid-tight way such that fluid cannot pass between said guide pin and said sleeve through said first sleeve section bore,
wherein said valve plate further includes a sealing surface,
wherein said valve body further includes a sealing surface,
wherein said valve body sealing surface and said valve plate sealing surface are substantially arranged parallel to each other and are aligned to closeably mate,
wherein when said valve plate is in said closed position, said valve body sealing surface and said valve plate sealing surface seal-tightly close against each other, said seal-tight closure closing said flow passage blocking flow through said valve body,
wherein said sealing surface of said valve plate is an annular collar portion of said valve plate,
wherein said sealing surface of said valve body is of an annular shape,
wherein said guide pin penetrates a cross-sectional valve plate surface surrounded by said valve body sealing surface, and
wherein sealing between said sealing surfaces is exclusively metal to metal.

* * * * *